No. 864,343. PATENTED AUG. 27, 1907.
W. R. SMITH.
APPARATUS FOR TREATING SKINS, &c.
APPLICATION FILED MAR. 24, 1906.

2 SHEETS—SHEET 1.

Witnesses:

Inventor:
W. R. Smith
by
Attorneys.

No. 864,343. PATENTED AUG. 27, 1907.
W. R. SMITH.
APPARATUS FOR TREATING SKINS, &c.
APPLICATION FILED MAR. 24, 1906.

2 SHEETS—SHEET 2.

Witnesses:

Inventor.
W. R. Smith
by
Attorneys.

UNITED STATES PATENT OFFICE.

WILLIAM R. SMITH, OF BUFFALO, NEW YORK, ASSIGNOR TO BUFFALO LEATHER CO., OF BUFFALO, NEW YORK, A CORPORATION OF WEST VIRGINIA.

APPARATUS FOR TREATING SKINS, &c.

No. 864,343.            Specification of Letters Patent.            Patented Aug. 27, 1907.

Application filed March 24, 1906. Serial No. 307,779.

*To all whom it may concern:*

Be it known that I, WILLIAM R. SMITH, of Buffalo, in the county of Erie and State of New York, have invented certain new and useful Improvements in Apparatus for Treating Skins, &c., of which the following is a specification.

This invention relates to apparatus for subjecting hides and skins and other articles to the action of a liquid for the purpose of washing the same to remove dirt and foreign matter, or for the purpose of applying to the articles a chemical solution as in the treatment of skins by a solution of lime for unhairing the skins.

The improvement has for its object to provide improved means for imparting frequent changes of position to the articles under treatment, as well as a more efficient and thorough agitation of the liquid employed, to the end that the desired result may be more quickly and efficiently accomplished.

The invention consists in the improved apparatus which I will now proceed to describe and claim.

Figure 1:
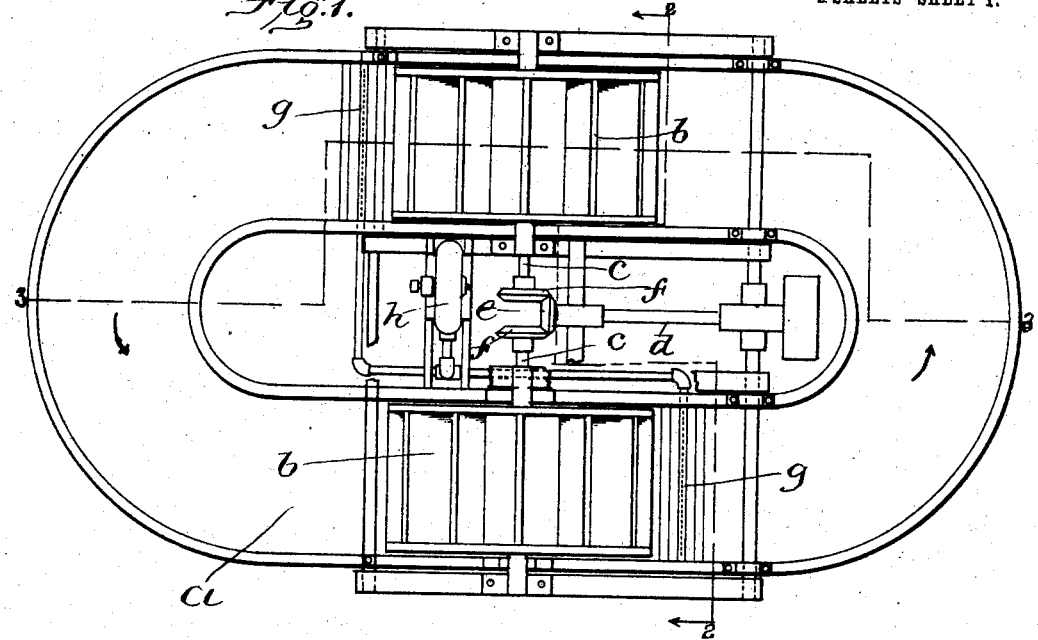
Figure 2:
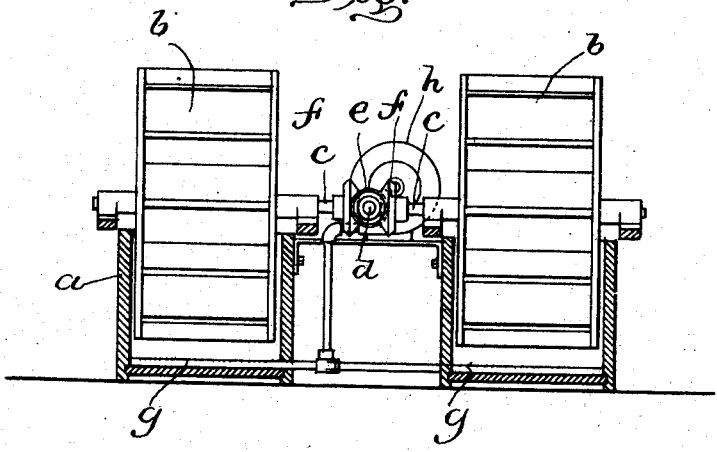
Figure 3:
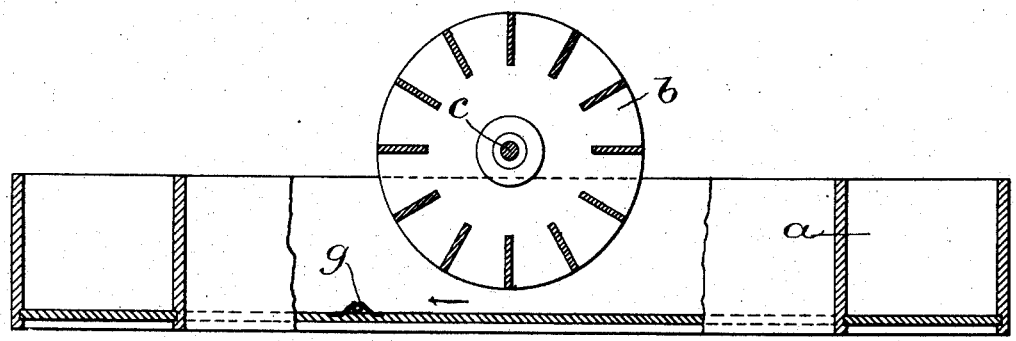
Figure 4:
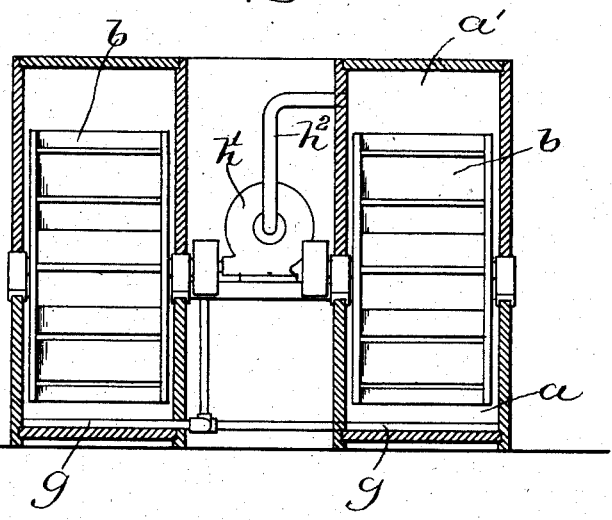

Of the accompanying drawings forming a part of this specification,—Figure 1 represents a top plan view of an apparatus embodying my invention. Fig. 2 represents a section of a portion of the apparatus on line 2—2 of Fig. 1. Fig. 3 represents a section on line 3—3 of Fig. 1. Fig. 4 represents a view similar to Fig. 2, showing a different embodiment of my invention.

The same letters of reference indicate the same parts in all the figures.

In the drawings, $a$ represents an endless tank or raceway which is preferably formed as a flattened ellipse as shown in Fig. 1, although it may be circular or of any other suitable form.

$b$ represents a paddle-wheel affixed to a shaft $c$, which is journaled in bearings above the tank, the lower blades of the wheel entering the liquid in the tank and extending substantially across the tank, so that the rotation of the wheel causes a continuous horizontal movement of the liquid. In practice, I employ two paddle-wheels extending across the two straight stretches of the tank, with their shafts $c\ c$ in alinement. The wheels are rotated simultaneously in opposite directions by suitable means such as a driven shaft $d$ having a bevel gear $e$ meshing with bevel gears $f\ f$ on the shafts of the two paddle-wheels. Each wheel imparts motion to the liquid with which it is in contact, the result being a progressive horizontal flow of the liquid in the endless tank.

A batch of skins placed in a charge of liquid in the tank will be moved horizontally by the liquid and will be kept in a substantially horizontal position by the current, the surfaces of each skin being free from close or clinging contact with the surfaces of the other skins. When the skins come under the paddle-wheels they are raised by the rising paddles to or toward the surface of the liquid and then move on toward the next wheel, sinking somewhat, it may be, in the liquid and being again raised by the paddles of the next wheel.

I find that the described apparatus causes the skins to float horizontally independently of each other and therefore treats all the skins uniformly so that there is no discoloration and no variation in the action of the liquid on different skins or on different parts of the same skin.

$g\ g$ represent air pipes or conduits, which enter the lower portion of a tank $a$ and extend across the same, there being preferably two of these pipes and each located adjacent to the rear or delivering side of one of the wheels. The pipes $g\ g$ are connected with a suitable air-forcing apparatus, which may be a blower $h$, of any suitable construction, or a suitable air pump. The portions of the pipes within the tank are perforated in such manner as to discharge air in a series of jets or streams into the liquid in the tank. The air bubbles rising through the liquid encounter the articles as they leave the paddles, which are carried thereby and accumulate in contact with the under sides of said articles, the accumulations of air buoying up the articles and preventing them from settling to the bottom of the tank. This buoying effect is produced as soon as the articles leave the paddle because, as above stated, the pipes $g$ are located adjacent to the delivering side of the wheels, and this effect continues until the articles thus buoyed up approach the succeeding paddle wheel, when the blades of the wheel in striking the articles have a tendency to tip the same and thus cause the air to move toward the rear edge or end of the buoyed up articles, the air thus displaced having a tendency to invert the articles and thus present to the blades of the paddle, as the upper surface, the surface which was before the lower surface. The movement of the air through the liquid causes an agitation of the liquid in addition to that caused by the movement of the paddle blades, which increases the effectiveness of the contact between the liquid and the articles carried thereby.

I have found that when the apparatus is used for washing hides, skins and other articles, the air introduced, as described, greatly facilitates the washing operation, there being a direct coöperation between the mechanical agitation effected by the paddle wheels and the air forced into the liquid at the bottom portion of the tank.

In Fig. 4 I show the tank extended above the paddle wheels to form a substantially air tight chamber $a'$ above the contents of the tank. In this case the blower or air forcing device is indicated at $h'$ and has its intake end connected by a conduit $h^2$ with the air chamber $a'$. The blower forces air through the pipes $g\ g$ into the lower portion of the tank as in the construction above described. This form of apparatus is adapted for the process of liming skins, the liquid in the tank containing carbonate of lime in solution. The object of the closed air chamber $a'$ above the tank is to enable the same air to be used indefinitely without admixture with outside air. At the commencement of the operation the air contained in the chamber $a'$ after being forced through the solution of hydrate of lime in the tank is deprived thereby of carbon dioxid, which is an objectionable element. The air is, therefore, to a certain extent purified, so that it acts more efficiently than would be the case if outside air, containing carbon dioxid, were continuously admitted.
My invention may be used for cleansing textile fabrics of various kinds, as well as for the washing, liming, soaking and bating of skins.

I claim:

1. An apparatus for treating skins comprising a tank or reservoir for containing a body of liquid, means for impelling said liquid and causing the skins to float horizontally therein, and means for discharging air under the traveling skins immediately adjacent to the delivering side of the said impelling means.
25. 2. An apparatus for treating skins comprising a tank or reservoir, adapted to contain a body of liquid, a mechanical agitator adapted to move the liquid and the skins immersed for treatment therein, and means for forcing air into the bottom portion of the tank immediately adjacent to the delivering side of said agitator.

3. An apparatus for treating skins comprising a tank or reservoir adapted to contain a body of liquid, a rotary paddle wheel having a shaft journaled above the surface of the liquid, and blades projecting into the liquid at the lower portion of the wheel, means for rotating the wheel, and means for forcing air into the bottom portion of the tank immediately adjacent to the delivering side of the wheel.

4. An apparatus for treating skins comprising an endless tank or reservoir adapted to contain a body of liquid, a rotary paddle wheel adapted to impel the contents of the tank, means for rotating the wheel, and means for forcing air into the bottom portion of the tank immediately adjacent to the delivering side of the wheel.

5. An apparatus for treating skins comprising an endless tank or reservoir adapted to contain a body of liquid, two rotary paddle wheels located in opposite stretches or portions of the tank, means for rotating the wheels simultaneously in opposite directions, and means for forcing air into the bottom portion of the tank immediately adjacent to the delivering side of each wheel.

In testimony whereof I have affixed my signature, in presence of two witnesses.

WILLIAM R. SMITH.

Witnesses:
   L. J. WYATT,
   FRANCIS A. RANSOM.